(12) United States Patent
Muirhead

(10) Patent No.: US 8,376,457 B2
(45) Date of Patent: Feb. 19, 2013

(54) WIRELESSLY CONTROLLABLE ELECTRICAL FUNCTIONAL UNIT FOR AN AIRCRAFT

(75) Inventor: Andrew Muirhead, Norderstedt (DE)

(73) Assignee: Lufthansa Technik AG, Hamburg (DE)

( * ) Notice: Subject to any disclaimer, the term of this patent is extended or adjusted under 35 U.S.C. 154(b) by 424 days.

(21) Appl. No.: 12/532,819

(22) PCT Filed: Mar. 25, 2008

(86) PCT No.: PCT/EP2008/002351
§ 371 (c)(1),
(2), (4) Date: Sep. 23, 2009

(87) PCT Pub. No.: WO2008/116626
PCT Pub. Date: Oct. 2, 2008

(65) Prior Publication Data
US 2010/0060050 A1    Mar. 11, 2010

(30) Foreign Application Priority Data
Mar. 23, 2007 (EP) .................... 07006103

(51) Int. Cl.
*A47C 7/62* (2006.01)
(52) U.S. Cl. ................ 297/217.3; 244/118.6
(58) Field of Classification Search ........... 297/217.1, 297/217.3; 244/188.6
See application file for complete search history.

(56) References Cited

U.S. PATENT DOCUMENTS

| | | | |
|---|---|---|---|
| 6,600,418 B2 * | 7/2003 | Francis et al. | 340/572.1 |
| 7,626,505 B2 * | 12/2009 | August et al. | 340/572.4 |
| 7,945,934 B2 * | 5/2011 | Margis et al. | 725/75 |
| 2006/0032979 A1 | 2/2006 | Mitchell et al. | |
| 2006/0109811 A1 | 5/2006 | Schotten et al. | |
| 2006/0174285 A1 * | 8/2006 | Brady et al. | 725/76 |
| 2006/0246892 A1 | 11/2006 | vonDoenhoff et al. | |
| 2008/0157997 A1 * | 7/2008 | Bleacher et al. | 340/825.24 |

OTHER PUBLICATIONS

Malykhina, E. (2004). "New Jets Will Come Equipped with RFID," located at <informationweek.com> visited on May 30, 2007. [1 page].
International Search Report mailed on May 8, 2008; 12 pages.

* cited by examiner

*Primary Examiner* — Sarah B McPartlin
(74) *Attorney, Agent, or Firm* — Baker Hostetler LLP

(57) ABSTRACT

An aircraft includes interchangeable, wirelessly controllable electrical or electronic functional units provided for use by passengers and associated with a seat or group of seats. The aircraft further includes installation sites for the functional units, each installation site being associated with one seat or a group of seats. The functional units are removable such that they can be installed and uninstalled in the installation sites or replaced during maintenance work without forfeiting the operational approval of the aircraft. Each functional unit includes an RFID reader operating in a contactless manner to identify the installation site of the functional unit and a device for the wireless transmission of the identified installation site to a database of the aircraft. An RFID tag is associated with each installation site and contains information readable by the RFID reader to identify the associated seat or group of seats.

6 Claims, 2 Drawing Sheets

WIRELESSLY CONTROLLABLE ELECTRICAL FUNCTIONAL UNIT FOR AN AIRCRAFT

REFERENCE TO RELATED APPLICATIONS

This application is a national stage application under 35 USC 371 of International Application No. PCT/EP2008/002351, filed Mar. 25, 2008, which claims the priority of European Patent Application No. 07 006 103.1, filed Mar. 23, 2007, the contents of which prior applications are incorporated herein by reference.

FIELD OF THE INVENTION

The invention relates to an aircraft, having a plurality of wirelessly controllable electrical or electronic functional units which can be interchanged with one another, are intended for use by passengers and are associated with a seat or a group of seats, and having a plurality of installation locations for these functional units, with each installation location being associated with a seat or a group of seats.

BACKGROUND OF THE INVENTION

The electronics, in particular entertainment electronics, onboard a passenger aircraft are becoming evermore complex. For example, it is now standard practice that individual audio and/or video content can be called up at every seat, at least in the first class and business class of passenger aircraft. Corresponding functional units must accordingly be individually controllable, and it must be possible to feed them with different content.

SUMMARY OF THE INVENTION

The invention is based on the object of providing an aircraft of the type mentioned initially which can be equipped with such functional units with little effort, during installation and maintenance.

This object is achieved by the following features:

a) the functional units are removable parts which can be installed and removed and/or replaced without cancellation of the operating clearance of the aircraft during maintenance work;

b) each functional unit has a device which operates in a non-contacting manner and is in the form of an RFID reader, for identification of its installation location, as well as a device for wireless transmission of the identified installation location and storage in a database in the aircraft;

c) each installation location has an associated RFID tag which contains information which can be read by the RFID reader and identifies the associated seat or the group of seats.

First of all, some of the terms used in the context of the invention will be explained.

An electrical or electronic functional unit is any group of components which, as an entity, can carry out a specific function, for example control or monitoring functions, input and output of data, in particular audio and/or video data or the like.

The functional unit is wirelessly controllable. This means that it can wirelessly receive and/or transmit (preferably by electromagnetic radiation) control and/or monitoring signals and/or input data and/or data to be output (for example audio and/or video data).

The functional unit is a removable part. This term in aviation law means a unit which can be installed and removed and/or replaced without cancellation of the operating clearance of the aircraft during maintenance work. These are therefore functional units and assemblies which do not fall within the category of so-called required equipment in accordance with the EASA Certification Specification, Subpart F. They are preferably cabin entertainment units, which are used for entertainment and/or information for passengers. They are particularly preferably so-called passenger entertainment devices which are installed in the vicinity of a passenger seat, in particular functional units which allow audio and/or video data to be output and furthermore preferably have a screen (display).

According to the invention, the functional unit has a device for identification of the installation location in the aircraft. This means that, after the functional unit has been installed in the aircraft, the precise installation location can be determined and can be transmitted electronically to a local database of the functional unit or preferably to a central database in a computer in the aircraft.

The invention makes it possible to associate electrical functional units with one specific installation location without any problems after installation in an aircraft, and to be controlled wirelessly, in a specifically tailor-made fashion at this installation location, as well as receiving control commands therefrom.

The installation of video on demand systems onboard aircraft, which has now become standard practice, requires that every video display at a seat or possibly at a group of seats can be fed individually with content from a central audio/video server. In the prior art, it is normal practice to lay both an electrical power supply and signal cables, which are connected to the corresponding server, to each seat for this purpose, via which the command/data interchange can take place with the audio/video server. This wiring involves an extremely high level of complexity.

Fundamentally, it is admittedly already known in the prior art for wireless data networks to be installed in aircraft, such as Ethernets or WLANs. In contrast to fixed wiring, precise identification of the functional unit in the wireless network is required for communication via a wireless network. Each unit within a wireless network based on the Internet Protocol has a specific MAC address. However, this does not correspond to a corresponding installation location in the aircraft, in particular for example not with a specific seat number. When a passenger in seat 2A requests a specific film, this must be transmitted via the wireless network to the display at the appropriate installation location. This does not directly correspond to the MAC address of the associated display.

The device according to the invention for identification of the installation location in the aircraft allows each functional unit to be associated by means of its MAC address with a specific installation location (for example seat number), and therefore allows unambiguous addressing of this functional unit in the wireless network on the basis of the installation location.

The device for identification of the installation location in the aircraft operates in a non-contacting manner. This means that there is no need for any mechanical contact to be made to identify the installation location.

The device for identification of the installation location in the aircraft has at least one RFID tag (Radio Frequency Identification Tag) and at least one RFID reader. The RFID reader is associated with the functional unit, and at least one RFID tag is associated with the installation location.

Therefore, in this embodiment, each installation location (for example a seat) has an associated RFID tag. These components, which are known in the prior art, are passive components which, in particular, do not require their own power supply. For example, on installation of a seat, the seat number can be written to the associated RFID tag at the intended installation location of the associated entertainment display.

The functional unit has an active RFID reader. After installation or replacement of a functional unit such as this, this reader is activated and reads the associated seat number from the RFID tag. The MAC address of the functional unit can now be associated with the corresponding seat number in an external database (for example in the audio/video server in the aircraft), as a result of which this functional unit can now be specifically controlled via its seat number.

The activation of the RFID reader can optionally be initiated automatically by the installation process of the functional unit, or else manually, for example by operating an appropriate apparatus or a switch or pushbutton on the functional unit after its installation. It is likewise possible, after installation/replacement of functional units, for the RFID readers of all the functional units or of some of the functional units to be activated centrally via the wireless network, with the associated seat number of the RFID tag being read in this manner, and associated with the MAC address of the functional unit.

By way of example, instead of RFID tags and readers, barcodes or other optical codes and corresponding readers can also be used within the scope of the invention.

Within the scope of the invention it is preferable for the functional unit to be wirelessly controllable via a WLAN. In one preferred embodiment, it is designed to output audio and/or video content, in particular preferably has a corresponding display (screen). Within the scope of the invention, the functional unit may itself be provided with operating and control elements, for example it may have appropriate control keys or a touchscreen. Alternatively, it can be operated by the user by means of a further separate functional unit, for example by means of a separate remote control or by means of a control panel, for example in the armrest of the seat, said control panel being separate from the actual display.

The subject matter of the invention is therefore an aircraft having a plurality of functional units according to the invention and a plurality of installation locations for these functional units. Each installation location is associated with a seat or a group of seats, and the device according to the invention for identification of the installation location in the aircraft is designed for identification of the seat or the group of seats where the corresponding functional unit is installed. Each installation location has an associated RFID tag which identifies the associated seat or the group of seats. The aircraft has a memory device (for example an appropriate memory in the audio and/or video server), in which the electronic address of each functional unit (MAC address) is associated with a seat or a group of seats.

According to the invention, it is possible for the corresponding memory device or database to provide a so-called "live schematic" on a suitable output device such as a display or printer. This is a self-updating circuit diagram or a corresponding chart of the respective current aircraft configuration (seating plan or the like) with a representation of the respectively installed removable parts (for example represented by their MAC address). A live schematic such as this can be displayed in graphics form, according to the invention, in a simple and clear manner. This live schematic can be printed out in order to carry out a maintenance task, for example together with an associated "jobcard", or can be displayed on a handheld PC. This allows the maintenance mechanic to carry out a specific maintenance or repair operation or retrospective modification of the installation configuration without previously having to tediously manually determine the precise installation position of a relevant removable part for this purpose, and having to verify this after completion of the activity.

BRIEF DESCRIPTION OF THE DRAWINGS

An exemplary embodiment of the invention will be explained in the following text with reference to the drawings, wherein.

DETAILED DESCRIPTION OF THE INVENTION

Figure 1:
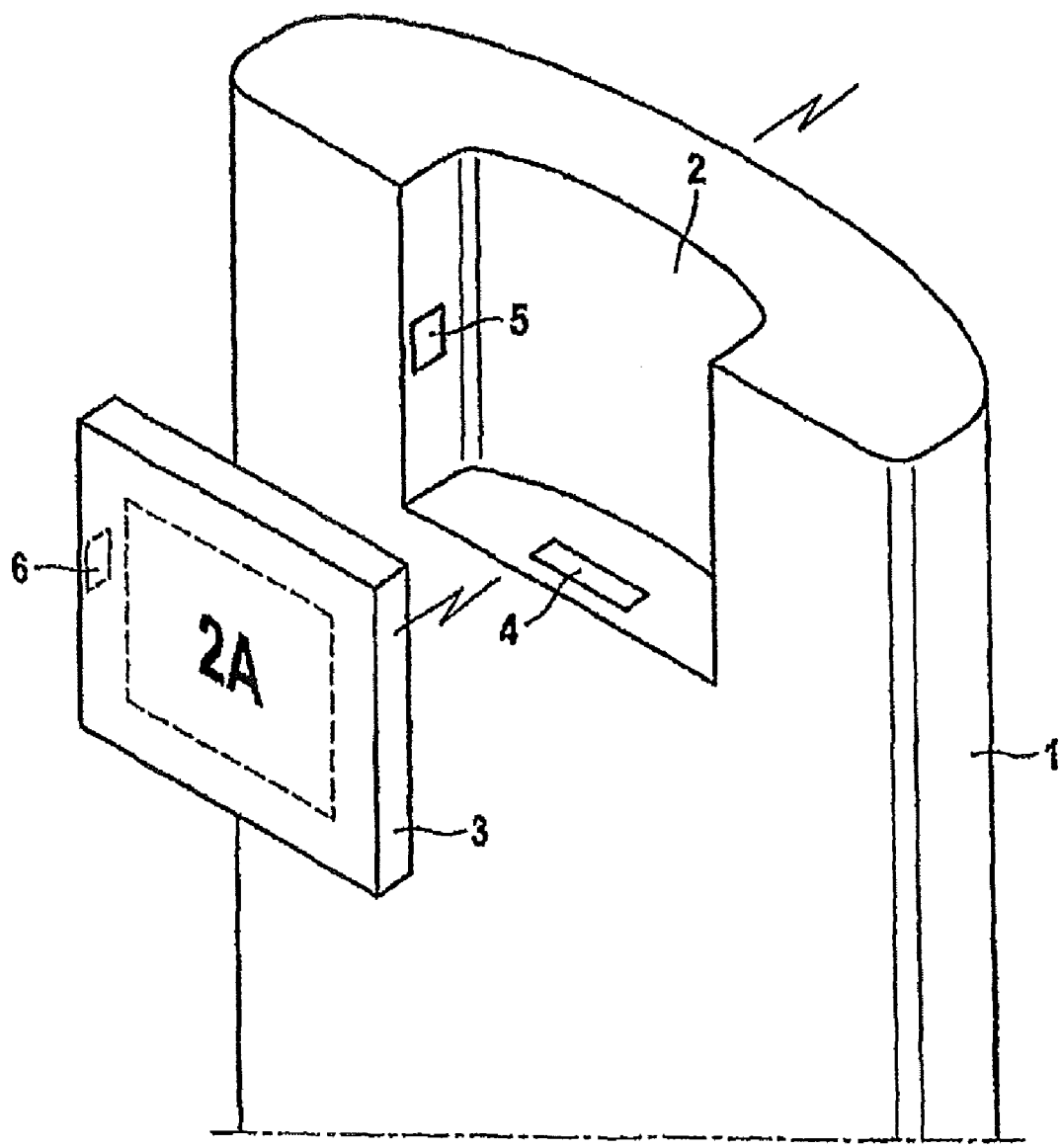
FIG. 1 depicts an exemplary configuration of a functional unit.
Figure 2:
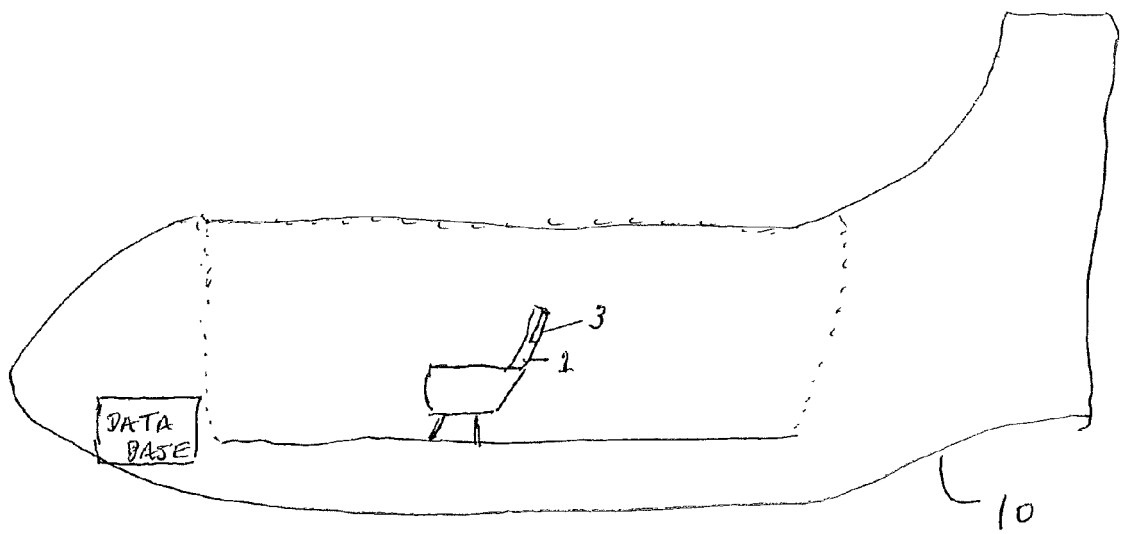
FIG. 2 depicts the functional unit of FIG. 1 and a database installed in an aircraft.

A seat back 1 in an aircraft 10 has an installation trough 2 for a display 3 of a cabin entertainment system. An electrical connecting element 4, via which the operating voltage is supplied to the display 3, is provided in the installation trough 2.

A passive RFID tag 5 is arranged in the installation trough 2. When the seat is installed, the current seat number is written to it, and the seat number of the installation location or of the installation trough 2 is therefore stored permanently, as electronic memory means.

The display unit 3 is designed for wireless communication via an aircraft-internal WLAN with other units, in particular a corresponding audio/video server. At 6, this has an RFID reader which can be activated itself via the display unit 3 or by remote control via the WLAN from a corresponding central computer or control panel.

During installation or after replacement of a display 3 (for example after repair or maintenance), the RFID tag 5 in the installation trough 2 comes within range of the RFID reader 6. Triggered by the installation process or manually on the display unit 3, the RFID reader 6 can now be activated in order to read the seat number from the RFID tag 5, and to pass this via the wireless network to a central computer. The electronic MAC address of the display unit 3 is stored in a database in this central computer, together with the seat number read from the RFID tag 5. The display unit 3 can now be controlled via its seat number.

Alternatively (for example after installation/replacement of some or all of the display units 3), the RFID reading process can be activated centrally, controlled centrally by a computer, in some or all of the display units 3, and the seat numbers that are read are then passed back to the central computer.

According to the invention, it is therefore possible to remove and reinstall a plurality of displays for maintenance and/or repair purposes without having to worry about the precise association of the display units with the seats. Instead of this, after reinstallation, the current installation location of the display units 3 is detected and is stored in the central computer in the aircraft. If a passenger in a seat now calls up audio and/or video content from the central computer, the MAC address of the display unit 3 associated with the corresponding seat number is first of all called up in the database of the central computer, and the appropriate audio/video content is then sent via the wireless network to this MAC address.

The invention claimed is:
1. An aircraft, comprising:
a plurality of wirelessly controllable electrical or electronic functional units configured to be interchangeable with one another and for use by passengers, each being associated with a seat or group of seats; and
a plurality of installation locations for the plurality of functional units, each installation location being associated with a seat or group of seats, wherein:

the functional units are removable such that they can be installed and removed or replaced without cancellation of an operating clearance of the aircraft during maintenance, each functional unit comprises (i) an RFID reader configured to operate in a non-contacting manner to identify an installation location of the functional unit and (ii) a device configured to wirelessly transmit the identified installation location for storage in a database in the aircraft, and each installation location has an associated RFID tag encoding information which can be read by an RFID reader of a functional unit and which identifies the associated seat or group of seats.

2. The aircraft of claim 1, wherein the functional units are wirelessly controllable via a WLAN.

3. The aircraft of claim 1 or 2, wherein the functional units are cabin entertainment units.

4. The aircraft of claim 3, wherein the functional units are designed to output audio and/or video content.

5. The aircraft of claim 1, wherein the functional units each comprise a display.

6. The aircraft of claim 1, wherein the aircraft further comprises a database in which an electronic address of each functional unit is associated with a seat or group of seats.

* * * * *